Patented July 20, 1926.

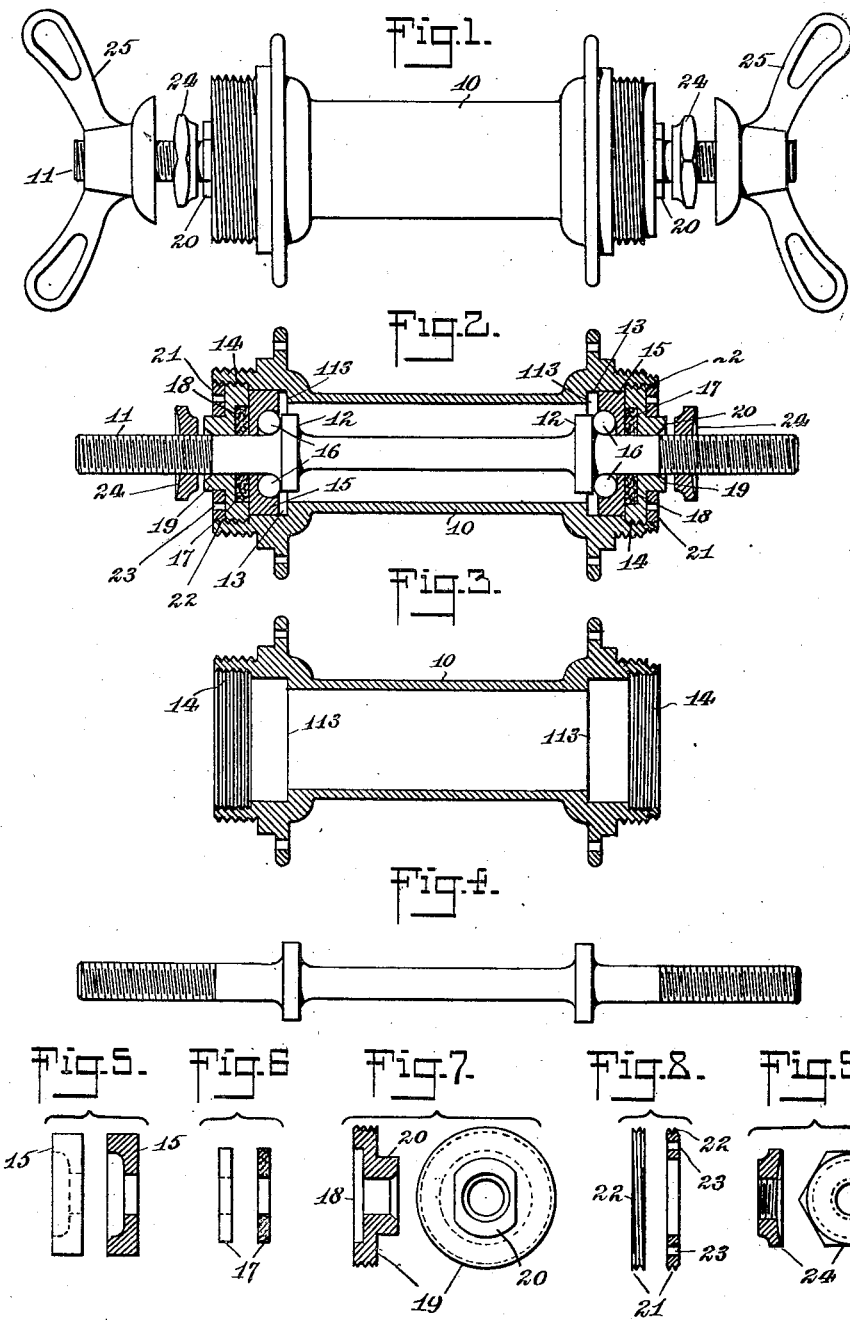

1,593,474

UNITED STATES PATENT OFFICE.

GIUSEPPE SERRAO, OF TURIN, ITALY.

BEARING.

Application filed May 21, 1925, Serial No. 31,837, and in Italy February 16, 1925.

My invention while capable of a wider use as a bearing generally, has special use as embodied in the hub of cycles such as bicycles, motor-cycles, tricycles, etc.

The invention has for its general object to simplify the construction of the bearing with a consequent increased economy in the manufacturing, assemblage, and disassemblage of the device.

A further important object of the invention is to insure an effective lubrication of the bearing and the journal such as an axle, shaft, bolt, pin, or other journal element, movably placed in a bearing.

Reference is to be had to the accompanying drawings forming a part of this specification, it being understood that the drawings are merely illustrative of one example of the invention.

Figure 1 is a side elevation of a bearing embodying my invention with a journal element in the shape of an axle;

Figure 2 represents a longitudinal vertical section through the bearing, the axle employed in the present instance being shown in side elevation;

Figure 3 is a longitudinal vertical section of the shell or hub of the bearing;

Figure 4 is a side elevation of the axle;

Figure 5 represents in edge view and in vertical section one of the elements employed in the bearing and fitting the axle or other journal element to complete the race for bearing balls;

Figure 6 represents in edge view and in vertical section a felt washer appurtenant to the bearing assemblage;

Figure 7 represents in vertical section and in side elevation an oil retaining element forming part of the bearing assemblage;

Figure 8 represents in edge view and in vertical section a retaining ring for the oil-retaining element;

Figure 9 represents in vertical section and in side elevation a nut for holding the parts of the bearing in assembled relation.

In carrying out my invention in accordance with the illustrated example pertaining to the bearing for cycles, a shell, hub or box 10 is provided, in which the journal here shown as an axle 11, is emplaced. Said journal element 11 has integral collars or annular flanges 12 within the shell 10. Also said shell has adjacent to each end a counterbore 13 presenting an outwardly facing shoulder 113 and a still further enlarged counter-bore 14, the shell at said counter-bore 14 being internally threaded. Bearing elements 15 are fitted on the journal 11 and complete with collars 12 races for bearing balls 16, said bearing elements 15 being accommodated in the counter-bores 13.

Fitting the journal element also outward of the bearing elements 15 are washers 17 of felt or equivalent material. Said felt washers 17 are received in counter-bores 18 of oil retaining ring-like elements 19 which are accommodated in the counter-bores 14 of shell 10. Said oil retaining elements 19 are formed with hubs 20 at the outer ends.

Fitting over the hubs 20 of the oil-retaining elements 19 are rings 21 to hold the oil-retaining elements 19 in close relation to bearing element 15 and felt washer 17. The retaining rings 21 have external threads as at 22 to take the internal threads in the counter-bore 14 outside of the oil-retaining element 19. In practice, the retaining rings 21 have transverse holes 23 diametrically opposite each other or equivalent means to receive a wrench (not shown) for screwing the retaining ring into the internal threads of the counter-bore 14.

The bearing assemblage is completed when the journal element 11 is in place by nuts 24 on the threaded ends of the journal 11, said nuts screwing against the outer faces of the hub 20 of oil-retaining elements 19, said nuts 24 being here shown as wing nuts.

From the foregoing it will be seen that with the shell 10 filled with oil, leakage of the oil will be prevented at the ends of the bearing by reason of the elements 15, 17 and 19, held in their cooperative relation by the retaining ring 21 and nut 24.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

In a bearing, an axle having screw threaded ends and provided with collars a short distance from the screw threaded portions of said ends, a shell having at each end two bores of unequal diameters, the outer and larger bores being internally screw threaded, apertured and recessed bearing members on the axle in the smaller bore of the shell, balls between the said members and the collars of the axle, externally threaded ring-like members having recesses in their inner faces and provided with hubs on their outer faces, said members screwing in the larger bores of the shell and into engagement with the bearing member, fibrous washers in the recess of the ring-like members, externally threaded rings on the hub of the ring-like members and screwing into the larger bores of the shell into engagement with said members, and nuts on the threaded ends of the axle and adapted to screw into engagement with the hub of the ring-like members.

GIUSEPPE SERRAO.